Figure 1:
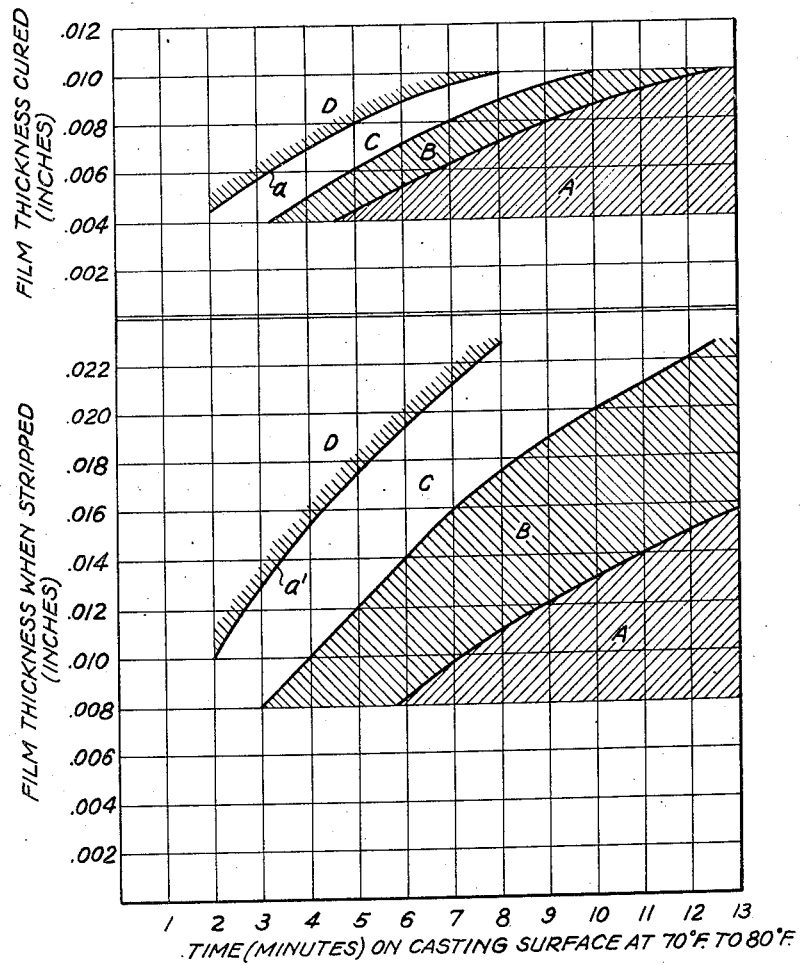

Charles R. Fordyce
Bruce E. Gramkee
INVENTORS

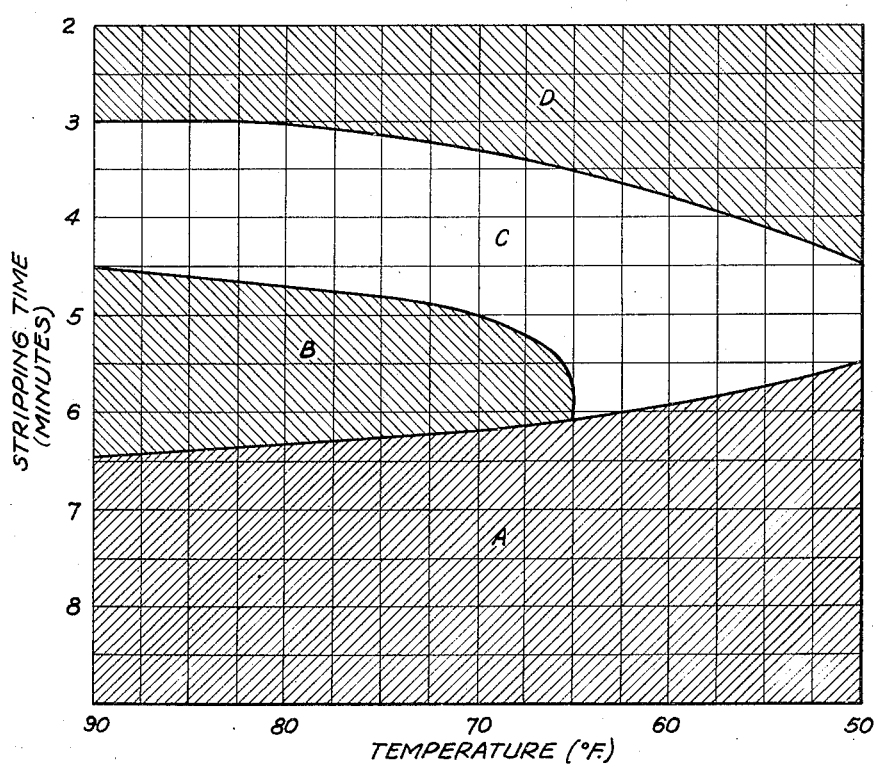

Patented Jan. 3, 1950

2,492,978

UNITED STATES PATENT OFFICE 2,492,978

CELLULOSE ACETATE SOLUTION

Charles R. Fordyce and Bruce E. Gramkee, Rochester, N. Y., assignors to Eastman Kodak Company, Rochester, N. Y., a corporation of New Jersey Application November 5, 1946, Serial No. 707,808

3 Claims. (Cl. 106—190)

This invention relates to a cellulose acetate solution.

For many years cellulose nitrate has occupied a unique position as a material for the production of commercial motion picture film base. Since the advent of commercial cinematography some forty years ago, cellulose nitrate has remained preeminent as a base for motion picture film by virtue of the fact that it displays a peculiar combination of high tensile strength, flexibility, moisture resistance and rigidity. High tensile strength is necessary to give the film the wearing qualities which will enable it to resist the tearing and abrading action which occurs at the perforations when the film is passed over the sprockets of processing and projection machines. Flexibility is essential to proper behavior on handling. Good moisture resistance is necessary to prevent excessive curl under conditions of varying humidity, to prevent the development of waviness which would otherwise result from variations in the moisture content, and to reduce the dimensional change which the photographic film undergoes in the drying operation following development of the photographic image. Good rigidity, not only reduces the tendency of the photographic film to curl, but also helps prevent unsteadiness during projection.

All of these desirable qualities are possessed to a high degree by cellulose nitrate film. Cellulose nitrate is, however, an inorganic acid ester of cellulose and film made therefrom has the drawback of inflammability and instability, the film becoming discolored and brittle on long standing unless the cellulose nitrate has been manufactured with the greatest of care and skill.

In the entirely separate and distinct field of organic acid esters of cellulose, many such esters have been suggested for use in producing commercial motion picture film base; of these esters, cellulose acetate and related cellulose mixed esters, such as cellulose acetate propionate and cellulose acetate butyrate have thus far proved to be the most useful. However, those esters which are susceptible of casting into films from acetone, although quite satisfactory for use in the production of cut sheet, X-ray amateur cine and other types of films in the use of which safety is the paramount factor desired, nevertheless do not give to films the physical properties enumerated above so as to permit their use for this purpose in the commercial motion picture field. For example, films produced from acetone-soluble cellulose acetate have low tensile strength, poor dimensional stability and a lower degree of rigidity than cellulose nitrate films. Moisture susceptibility is a particular defect of such cellulose acetate films giving rise to a dimensional change, as shown by swell and shrink measurements, of about twice that desired. Also, commercial motion picture films vary in swell and shrink amplitude from about 0.5% to 0.8%, whereas the cellulose acetate safety films available up to the present time vary in swell and shrink amplitude from 1% to often as high as 1.75% and have been for this reason, among others, unsuitable for professional motion picture use. Similarly, films produced from the mixed esters, although in some cases equal to commercial motion picture films in dimensional stability, are inferior in tensile strength and rigidity.

Among attempts to provide a satisfactory cellulose organic acid ester cine film base many investigators have thought that fully esterified cellulose (cellulose triacetate) would have potential value for this purpose if some means could be devised for satisfactorily dealing with it in the casting or film-forming operation.

While films produced from cellulose triacetate have moisture resistance which is superior to that of films produced from acetone-soluble cellulose acetate, and a higher tensile strength, the material has very limited solubility and has presented extreme technical difficulties in the casting operation. Methylene chloride, and more particularly mixtures of methylene chloride with methyl or ethyl alcohol, have for many years been about the only useful active solvents for cellulose triacetate and even today are the only practical basic solvents adapted for commercial use. It has been found, however, that films cast under the usual conditions heretofore known to the art, from solutions of cellulose triacetate in these solvent mixtures, have certain undesirable characteristics, such as brittleness, which make them of inferior value in the commercial motion picture industry.

Fully as important as the above-mentioned deficiencies of known cellulose triacetate film-forming compositions is the fact that there is an economic disadvantage in their use, because of the much lower speeds heretofore attainable in the casting operation.

We have discovered that cellulose acetate having an acetyl content of from 42.5% to 44.0% will, when formed into a sheet in the manner hereinafter described, give a sheet which has properties admirably suited for photographic film base of a character fully as acceptable and even in some respects superior to present day commercial motion picture film base.

An object is to provide compositions from high-acetyl cellulose acetates adapted for the casting of film base having such physical properties as to render it acceptable for use in the commercial motion picture industry. Still another object is to provide from high-acetyl cellulose acetates, compositions adapted for the casting at high speeds of cine film base having high tensile strength, good flexibility, moisture resistance and rigidity, noninflammability and good stability.

These objects are accomplished by the following invention which is based fundamentally upon the very unusual discovery that solutions of certain high-acetyl cellulose acetates in methylene chloride-alcohol may be converted into solutions which are capable of being cast by our process into film base having physical properties highly desirable for commercial motion picture film base, by adding a special diluent thereto. Specifically, we have found that if a cellulose acetate containing from 42.5% to 44.0% acetyl and preferably 43.0% to 43.5% acetyl is dissolved in a solvent composed of 55% to 85% by weight methylene chloride, from 5% to 15% methyl alcohol or ethyl alcohol, and, as a special ingredient, 10% to 30%, based on the weight of the total solvent, of ethylene chloride, the resulting solution may be cast and stripped from the casting surface under certain special conditions which will result in a film having physical properties highly desirable for commercial motion picture film base. Hereinafter, when we refer to high-acetyl-cellulose acetate as used in our invention, we refer to cellulose acetate having an acetyl content of from 42.5% to 44.0%.

As to the special conditions, our film-forming solution is deposited upon a film-forming surface which is maintained within the practical limits of 50° F. to 90° F. and is allowed to remain on such film-forming surface only until the film has cured down to 125% to 100% greater than the thickness which the film will have when completely cured, whereupon the film is stripped from the film-casting surface and subjected to further curing in the usual manner known to the art.

The unusual and distinctive property of ethylene chloride by virtue of which it converts the methylene chloride-alcohol solvent combination to an unusually effective casting solvent for high-acetyl cellulose acetate is brought into sharp relief when one takes into consideration the fact that closely related solvents such as butylene chloride as well as such solvents as acetone, methyl ethyl ketone, benzene and many others, have no such effect when added to methylene chloride-alcohol, and films cast from such solvent combinations do not have the required physical properties. We have also discovered that propylene chloride has an effect similar to that of ethylene chloride but requires a different range of proportions and different range of stripping thickness from that of the ethylene chloride compositions, as described and claimed in our application of even date, Serial No. 707,807.

In the following examples and description we have set forth several of the preferred embodiments of our invention, but they are included merely for purposes of illustration and not as a limitation thereof.

In the accompanying drawings:

Fig. 1 and Fig. 2 are graphic representations of certain of the conditions under which our process is operated.

Typical film-forming operations carried out in accordance with our invention are given in the following examples:

Example 1

A solution was prepared by dissolving 100 parts of cellulose acetate of 43.5% acetyl content in a mixture of 390 parts of methylene chloride, 150 parts of ethylene chloride and 60 parts of methyl alcohol. After the cellulose ester had completely dissolved, 15 parts of triphenyl phosphate were added.

The solution was maintained at 80° F. and fed into the hopper of a film casting machine from which it was applied in uniform thickness to the surface of a casting wheel at a temperature of 75° F. in such a thickness as to obtain a film of .0054″ thickness upon complete evaporation of the solvents.

By gradually increasing the speed of casting it was found that a minimum time of 6¼ minutes upon the casting surface was required to enable continuous removal of the film in good appearance and without leaving any traces of residual deposit on the casting surface. The thickness of stripping at this condition was found to be .0082″, which was 52% greater than the cured thickness.

After complete evaporation of volatile solvent the film was found to be strong, flexible, and of good appearance, but somewhat more susceptible to water than was desirable. The swell and shrink amplitude was 1.04 in the lengthwise and 1.22 in the widthwise direction.

As a contrast or comparison, the speed of operation was rapidly increased to a casting time of 4 minutes on the casting surface, under which condition the film was found to be in the form of a strippable sheet, and could be removed from the casting surface without leaving a residual deposit, even though at slower speeds this was not possible. Under this condition the film at stripping was .0113″ thick, which was 109% greater than its cured thickness of .0054″. The product thus obtained had a tensile strength of 24.5 kilograms (16,500 pounds per square inch), a flexibility of 16 folds, and a swell and shrink amplitude of 0.70 in the lengthwise and 1.08 in the widthwise direction.

Example 2

A cellulose acetate solution prepared exactly as in Example 1 was maintained at 70° F. and cast into a transparent sheet by depositing it on the surface of a casting wheel maintained at 60° F. The solution was applied in such thickness as to give a completely cured film .0055″ thick.

The casting operation was adjusted to such speed that the film remained on the casting surface for 4½ minutes at which time it was continuously removed in the form of a strippable gel .012″ thick, which was 118% greater than its cured thickness.

The product after complete evaporation of volatile solvent exhibited high tensile strength, good rigidity and good flexibility, and had a swell and shrink amplitude of .74 in the lengthwise and 1.04 in the widthwise direction.

Example 3

A solution was prepared by dissolving 100 parts of cellulose acetate of 43.0% acetyl content in a mixture of 360 parts of methylene chloride, 180 parts of ethylene chloride and 60 parts of methyl alcohol. After the cellulose ester had completely dissolved, 15 parts of triphenyl phosphate were added as plasticizer.

The solution was applied to a casting surface at 80° F. in such an amount as to produce a completely cured film of .0056" thickness. After 3½ minutes on the casting surface the film was continuously removed in the form of a strippable gel having a thickness of .012" which is 115% greater than that of the cured film.

The product so obtained had a tensile strength of 23 kilograms (15,500 pounds per square inch), a flexibility of 16 folds, and a swell and shrink amplitude of .80 in the lengthwise and 1.03 in the widthwise direction.

*Example 4*

A solution was prepared by dissolving 100 parts of cellulose acetate of 44% acetyl content in a mixture of 450 parts of methylene chloride, 90 parts of ethylene chloride, and 60 parts of methyl alcohol. To this was added 15 parts of triphenyl phosphate as plasticizer.

This solution at 70° F. was applied to a casting surface at 60° F. in such a thickness as to produce a completely cured film .0054" thick. After five minutes on the casting surface the film was continuously removed in the form of a strippable gel having a thickness of .011" which was 103% greater than the thickness when completely cured.

The product had a tensile strength of 22 kilograms (14,900 pounds per square inch), a flexibility of 17 folds, and a swell and shrink amplitude of .70 in the lengthwise and .90 in the widthwise direction.

While the acetone-insoluble cellulose acetates having an acetyl range of 42.5% to 44.0% are all operable in producing films of improved physical properties in accordance with our invention, we prefer to employ the acetates having an acetyl content within the range of 43.0% to 43.5% because they provide products for which film cements can be more readily prepared and applied than is the case with films produced from cellulose acetates of higher acetyl content and because cellulose acetates of 43.0% to 43.5% acetyl content are better adapted to the casting and curing conditions of our invention.

The cellulose acetate best suited for our invention has a viscosity at 25° C. of from 3,000 to 10,000 centipoises as determined in a 10% solution by weight in a solvent composed of 90% methylene chloride and 10% anhydrous methyl alcohol by weight.

The ratio of cellulose acetate to solvent mixture most useful in our invention is approximately 1 to 5 although ratios up to 1 to 8 can be employed.

It will be apparent from the above examples and description of our process that it has many advantageous features which distinguish it from the prior art. First and most important is the fact that by an extremely simple expedient, namely, the addition of ethylene chloride to the methylene chloride-alcohol primary solvent, we have solved a problem of long standing in the motion picture industry, the problem of how to produce a safety type film which would have physical properties equal to or better than present-day commercial motion picture film so as to permit its ready and convenient use in modern processing and projection apparatus.

Specifically, our invention has, as indicated above, resulted in the provision of a high-acetyl cellulose acetate film having physical properties in all important respects comparable to those of the best commercial motion picture film. This will be apparent from the following tabulation of data obtained by testing representative present-day commercial safety cine film, commercial motion picture film and the film prepared in accordance with the instant invention. At this point it might be well to point out that commercial safety cine films have been used prior to the advent of our invention only for so-called amateur movies. Such film is normally made in 16-mm. width and used in lengths of from 50 to 400 feet. Such films are made from the acetone-soluble type of cellulose acetate (approximately 39–41% acetyl); the mixed esters such as cellulose acetate propionate and cellulose acetate butyrate are also used for such amateur cine film. All of these organic acid esters of cellulose in sheet form have sufficient tensile strength, sufficiently low swell and shrink amplitude, and other properties, to be very useful for amateur purposes for the reason that such film is usually projected only infrequently and is generally handled with a certain amount of care and consideration. However, as shown by the following tabulation, the properties of such safety film are not such as will stand the rigors of repeated projection in the average movie theater, several times a day and for long runs of possibly weeks in succession under conditions typified by the well-known slogan "The show must go on."

|  | Commerical Safety Cine Films | Commercial Motion Picture Films | High-Acetyl Cellulose Acetate Film Base of Our Invention |
|---|---|---|---|
| Tensile Strength, p. s. i. | 10,000–12,100 | 13,500–17,000 | 13,500–16,000 |
| Flexibility (Schopper folds) | 5–15 | 15–20 | 15–20 |
| Modulus of Elasticity (tension $10^5$ p. s. i.) | 3.8–4.5 | 5.5–6.5 | 4.8–5.8 |
| Swell and Shrink Amplitude (Lengthwise Direction) | 1.00–2.00 | 0.50–0.80 | 0.60–0.90 |
| Swell in Water at 70° F. (100 minutes) per cent | 0.80–1.50 | 0.20–0.40 | 0.30–0.40 |

"Swell and Shrink Amplitude" and "Swell in Water at 70° F." are alternate tests showing the same property in the film base stock, i. e. dimensional stability with moisture. All of the above five tests were made in the lengthwise direction for the reason that, in manufacture, motion picture film, such as that 35 mm. wide or 16 mm. wide, is prepared by slitting lengthwise a much wider sheet, and for the further reason that, due to its great length compared to width and the fact that it travels through a camera, processing machine and projector in the lengthwise direction good strength and low swell and shrink amplitude in the lengthwise direction is the more important. Under the casting, stripping and curing conditions of our invention, the above properties in the widthwise direction will more or less approximate those in the lengthwise direction but are not of great consequence, hence we have not included them in the above tabulation; some of these properties in the widthwise direction are given in the examples as a matter of interest and comparison.

The swell and shrink amplitude test is conducted as follows: Samples of film or sheeting to be tested are conditioned and measured in a constant humidity room at a relative humidity of 50%, and at a dry bulb thermometer reading of 70° F. For photographic film support of Cine Positive thickness (.005" to .006"), the time of conditioning should be 2¼ hours.

Strips 15 inches long and 35 mm. wide are cut from the sheet material. Usually two strips from each sample lengthwise and two strips widthwise are used for the test. Two sets of perforations, exactly 10 inches apart, are made in each strip. Measurements from outside edge to outside edge of the perforation holes are taken, using a gauge graduated in thousandths of an inch.

The strips are conditions at 50% relative humidity and measured. They are then tacked loosely on a wooden rack and placed in a constant temperature thermostatically controlled water bath at 100° F. and left for 17 hours. The samples are then wiped to remove excess moisture and reconditioned at 50% relative humidity and measured again and the dimensional change computed. This test measures the irreversible shrinkage, if any, due to loss of solvent from the film material and also that due to the release of internal mechanical strains.

The samples are then placed in a water bath at 125° F. for 30 minutes, then removed and measured for length as speedily as possible after removing surplus water. The samples are then placed in an oven at 125° F. for one hour then taken out and measured. This cycle is repeated three times or until the difference between the wet and dry readings becomes constant. The difference between the last wet and dry readings in percentage is the per cent swell and shrink amplitude. This test measures the permanent, characteristic tendency of the material to swell and shrink under the influence of absorbed and desorbed moisture.

From the above tabulation the comparability of the physical properties of film produced in accordance with our invention and the properties of present-day commercial motion picture film will be apparent; add to these properties the non-inflammability and stability of the film of our invention and it is easy to perceive the superiority thereof. Also apparent is the improvement in our films over the present-day commercial safety cine films, particularly in the matter of dimensional stability as indicated by their very low swell and shrink amplitude. It is to be noted that the films of the instant invention have a swell and shrink amplitude only about one-half that of commercial safety films and also that their flexibility is much greater so that the film base of our invention is virtually a different kind of film base than previous safety film.

However, of all the features of our invention, the most unusual and important is the fact that the film-forming solutions are so designed that the film is stripped from the casting surface while it is still 100% to 125% thicker than it is to become after it is completely cured. In fact, it appears that the ethylene chloride ingredient of the solvent combination actually contributes the peculiar and highly individual characteristics of the film-forming solution which permit it to be cast and stripped under these conditions by bringing about a state of coagulation in the partially cured film which at certain specific stages permits the film readily to be stripped from the coating surface to produce films of satisfactory physical properties. This most unusual aspect of our invention will be more apparent by reference to the curves of Fig. 1, which illustrate the relation of stripping thickness to casting speed when the casting surface is maintained at 70° F. to 80° F.

In every film-making operation primary consideration must be given to the matter of the ultimate or cured thickness of the film. The upper set of curves of Fig. 1 illustrates the relation between the cured film thickness in inches and the film-forming speed when high-acetyl cellulose acetate films are produced in accordance with our invention, speed in this case being expressed in terms of time in minutes during which the film-forming solution has remained on the casting surface, that is, the time which elapses from the instant the solution is deposited on the casting surface to the instant at which it is stripped therefrom. Time on the casting surface is generally referred to as "stripping time." Thus, in this set of curves cured thickness is plotted against stripping time. The lower set of curves, on the other hand, illustrates the relation between the thickness of the film at stripping while it contains a relatively large amount of solvent, and the time in minutes during which it has remained on the casting surface. Thus, in this second set of curves the uncured thickness of the film is plotted against stripping time.

It will be observed that both curves conform to the same general pattern, but that the respective areas delimited by the upper set of curves are smaller than the corresponding areas of the lower set of curves. The difference in the extent of the respective areas of the two sets of curves is, of course, explained by the fact that in the one case conditions are illustrated in which the film is substantially completely cured, while in the other case the film contains appreciable amounts of residual solvent.

Referring to the upper set of curves, the area A represents a range of film-forming operations in which the resulting film will be comparatively well cured at the time of stripping, that is, an area representing casting conditions in which, for a given cured thickness, the film has remained on the film-forming surface for such a length of time as to permit removal of a very substantial percentage of the original solvent. This area, therefore, represents such a slow film-forming operation and conditions in which films of such inferior physical characteristics are produced, as to lie outside the scope of our invention.

Area B represents another range of operation or set of conditions in which, for the same given cured film thickness, the casting speeds are greater than those falling within the conditions of area A. Under such conditions it has been found that, if for the same given cured thickness of film, the film-forming speed is increased, that is, the time on the casting surface is decreased, a point is reached where the film will not strip properly but tends to adhere tightly to, and to leave deposits of film material on, the casting surface. This point is reached at the boundary between area A and area B. As the speed is still further increased a point is reached where the film will again begin to strip properly. This point lies on the boundary between areas B and C. Continuing to assume the same given film thickness, as one further decreases the time during which the film remains on the casting surface, that is, increases the film-forming speed, a point is finally arrived at where any further increase in the film-forming speed results in imperfect stripping and a film of unsatisfactory physical properties. This point is reached at the boundary between areas C and D.

The above-described phenomena will be more fully illustrated by reference to the conditions prevailing when coating a film of given finally cured thickness. For example, assuming that the film is to have a cured thickness of .006" and also to possess the desired physical properties of high tensile strength, flexibility and good dimensional stability, it is apparent from the upper set of curves of Fig. 1 that such a film must be cast under conditions which fall within area C. This may be found by following from left to right along the abscissa corresponding to a cured thickness of .006" to the boundary between areas B and C, which will correspond to a stripping time of about 5 minutes. At this point the film begins to strip properly and to have good physical properties. The speed may be further increased until a minimum stripping time of a trifle less than 3½ minutes is attained, at which time poor stripping and unsatisfactory physical properties begin to appear.

We have referred to the fact that, in accordance with our invention, to produce a high-acetyl cellulose acetate film having the desired physical properties the film must be stripped from the film-forming surface while it is 100% to 125% thicker than it is to become when cured. This is illustrated graphically by a comparison between the upper and lower sets of curves of Fig. 2. For example, assuming the same cured thickness as above, namely .006", if one follows down the ordinate from the point where the .006" thickness abscissa intersects the boundary between areas C and D at the point $a$ corresponding to a stripping time of about 3⅓ minutes, it will be found that this ordinate intersects the corresponding curve of the lower set at the point $a'$ corresponding to a stripping thickness of about .0135". The difference between the two thicknesses is .0075". Therefore, the ultimately cured film of .006" thickness was stripped from the casting surface while it contained such an amount of solvent as to make it 125% thicker in that condition than its final cured thickness of .006".

If the temperature of the casting surface its lowered, somewhat different stripping characteristics result, as shown in the curves of Fig. 2, which illustrates operating conditions for producing a product of approximately .0055" cured thickness. The shaded area A represents slow stripping speeds, in which the film is not stripped in a coagulated condition as described by our process and does not, therefore, result in good physical properties. The shaded area B represents the range in which the partially cured film adheres to the casting surface and cannot be stripped successfully. The clear area C represents the operative range in which a strippable sheet is formed, which may be removed from the casting surface within a stripping thickness range of .0110" to .0124" or 100% to 125% greater than the cured thickness. The upper shaded area D represents an insufficient degree of gelation or curing to permit stripping. It will be noted that as the temperature of the casting surface is reduced from 90° to 70° F., area B becomes more narrow, but changes very gradually. At the low temperature range of 50 to 65° F., however, coagulation of the partially cured film has become sufficient to eliminate the sticking area B, and casting speeds anywhere from approximately six to four minutes may be employed.

While present cine film base stock has a more or less standard thickness of .005" to .006", it will be seen from the curves or graphs of Fig. 2 that our invention is applicable to high-acetyl cellulose acetate base stock ranging in thickness from .004" to .010" and, in the claims, safety cine film base stock will be understood to refer to this range of thickness.

In Fig. 2 we have shown a casting surface temperature range of from 50° F. to 90° F., and this is the practical operating range of casting surface temperature for our invention. If one maintains the film-casting surface at a temperature much in excess of 90° F., evaporation takes place with such rapidity that bubbles will form in the acetate sheet and thus give a film base stock which would not be useable. On the other hand, if one attempts to operate our invention with a film-casting surface maintained at a temperature much below 50° F., the curing time before stripping can be accomplished increases to a point where little or nothing is gained by attempted use of the invention. Accordingly, we have established the limits of 50° F. to 90° F. as the practical limits within which to maintain the film-casting surface.

It will be understood, of course, that the graph constituting Fig. 2 is drawn for a final cured thickness of .0055" for the acetate sheet and that this graph is constructed to show variation in stripping time resulting from variation in temperature of the film-casting surface from 50° F. to 90° F. for this particular final thickness of acetate sheet.

What we claim is:

1. As a new composition of matter, a cellulose acetate film-forming solution capable of being cast in the form of a sheet or film suitable for use as a commercial motion picture film base at two distinct ranges of film-forming speed for a given cured film thickness, said solution being composed of cellulose acetate having an acetyl content within the range of 42.5% to 44.0% dissolved in a solvent mixture composed of 55% to 85% by weight of methylene chloride, 15% to 5% of an unsubstituted aliphatic monohydric alcohol of 1 to 2 carbon atoms and 20% to 5% ethylene chloride.

2. As a new composition of matter, a cellulose acetate film-forming solution capable of being cast in the form of a sheet at two distinct ranges of film-forming speed for a given cured film thickness, said solution being composed of cellulose acetate having an acetyl content within the range of 43.0% to 43.5% dissolved in a solvent mixture composed of 55% to 85% by weight of methylene chloride, 15% to 5% of an unsubstituted aliphatic monohydric alcohol of 1 to 2 carbon atoms and 20% to 5% ethylene chloride.

3. As a new composition of matter, a cellulose acetate film-forming solution capable of being cast in the form of a sheet at two distinct ranges of film-forming speed for a given cured film thickness, said solution being composed of cellulose acetate having an acetyl content within the range of 43.0% to 43.5% dissolved in a solvent mixture composed of 65% by weight of methylene chloride, 10% of methyl alcohol and 25% ethylene chloride.

CHARLES R. FORDYCE.
BRUCE E. GRAMKEE.

(References on following page)

REFERENCES CITED

The following references are of record in the file of this patent:

UNITED STATES PATENTS

| Number | Name | Date |
|---|---|---|
| 1,384,188 | Goemer | July 12, 1921 |
| 1,668,946 | Clark et al. | May 8, 1928 |
| 1,844,365 | Moss | Feb. 9, 1932 |
| 1,880,067 | Barthelemy | Sept. 27, 1932 |
| 1,880,466 | Noller | Oct. 4, 1932 |
| 1,896,145 | Stand et al. | Feb. 7, 1933 |
| 1,930,134 | Smith | Oct. 10, 1933 |
| 1,969,183 | Reid | Aug. 7, 1934 |
| 2,000,622 | Taylor | May 7, 1935 |
| 2,037,292 | Weihe | Apr. 14, 1936 |
| 2,232,012 | Rooney | Feb. 18, 1941 |
| 2,319,052 | Fordyce | May 11, 1943 |

FOREIGN PATENTS

| Number | Country | Date |
|---|---|---|
| 512,967 | Great Britain | Sept. 29, 1939 |